July 7, 1959 — O. VON MEHREN — 2,893,791

BALL BEARING

Filed May 21, 1957

INVENTOR.
OSWALD VON MEHREN
BY
Oberlin & Limbach
ATTORNEYS.

United States Patent Office 2,893,791
Patented July 7, 1959

2,893,791

BALL BEARING

Oswald von Mehren, Lorain, Ohio, assignor to The Thew Shovel Company, Lorain, Ohio, a corporation of Ohio Application May 21, 1957, Serial No. 660,594

4 Claims. (Cl. 308—199)

The present invention relates generally as indicated to a ball bearing and more particularly to a ball bearing which has a novel form of resiliently deformable spacer interposed between successive balls or successive series of balls.

In the case of derricks, cranes, power shovels, excavators, and like equipment, that are provided with turntables, the large-size ball bearings employed therewith must be capable of handling heavy eccentric loads with consequent uneven distribution of loads on said turntable bearings.

In such ball bearings, the balls, as they pass through high load zones of the bearing, travel at differential speeds as compared with their normal speed whereby the balls are alternately crowded together and spread apart. Ball bearing manufacturers contend that the balls, as they successively enter the high load zones, tend to crowd together, and conversely, as they leave the high load zones, tend to move apart. It is for this reason that in a conventional ball bearing the ball separator is made to permit the balls to thus crowd together and to separate as they enter and leave the more heavily loaded zones. The conventional separator must also be designed to prevent oppositely moving surfaces of adjacent balls from coming into contact with each other because the rubbing velocity of ball surfaces is twice that of the velocity of the driven ball race. Also, rubbing pressures between the balls would be considerable since with the "full" type of ball bearing, the balls would have to force themselves from the unloaded zone into the loaded zone with pressures exerted at the ball equators or points of highest surface speed.

It is a principal object of this invention to provide a ball bearing which employs a composite spacer between adjacent balls which includes opposite yieldable or resiliently deformable elements that are contacted by the respective balls and an intervening carrier that serves as a positive stop to prevent stressing of said elements beyond their elastic limits and to prevent the adjacent balls from contacting one another.

It is another object of this invention to provide a ball bearing which includes spacers between successive balls which are characterized by thinness relative to the circumference of the bearing without sacrifice in strength whereby a maximum number of balls may be inserted in the bearing.

It is another object of this invention to provide a ball bearing and spacers therefor, in which the latter are in the form of unitary assemblies comprising resilient deformable elements having central portions that yield relative to their peripheral portions to thus accommodate alternate crowding together and separating of the balls as they enter and leave the loaded zones of the bearing.

Other objects and advantages of the present invention will become apparent as the following description proceeds.

To the accomplishment on the foregoing and related ends, the invention, then, comprises the features herein-after fully described and particularly pointed out in the claims, the following description and the annexed drawing setting forth in detail a certain illustrative embodiment of the invention, this being indicative, however, but one of the various ways in which the principle of the invention may be employed.

Figure 1:
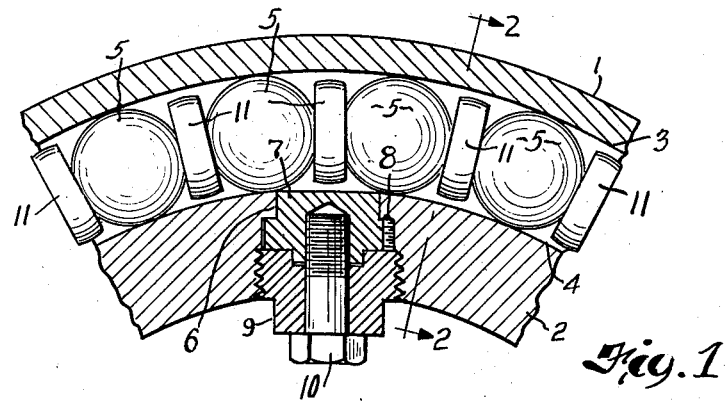
Fig. 1 is a fragmentary cross-section view of a ball bearing having ball spacers therein constructed in accordance with the present invention, such section having been taken in the medial trans-axial plane of the bearing raceways.
Figure 2:
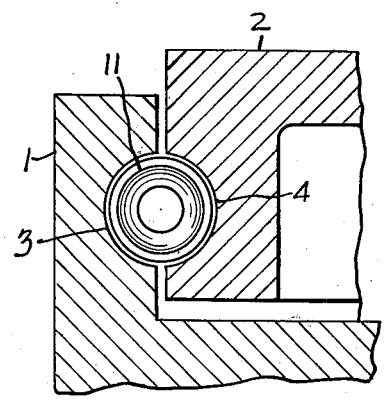
Fig. 2 is a radial cross-section view taken substantially along the line 2—2, Fig. 1.

Referring now more specifically to the several figures of the drawing, the reference numeral 1 designates the outer bearing member and the reference numeral 2 designates the inner bearing member, said outer and inner members being formed with complemental raceways 3 and 4 to accommodate a circumferential series of balls 5 therein. Said balls 5 may be inserted as through the opening 6 formed in the inner member 2 which opening is closed as by means of the plug 7 which is locked against rotation by key screw 8 and which is locked in place by bushing 9 and bolt 10.

Figure 3:
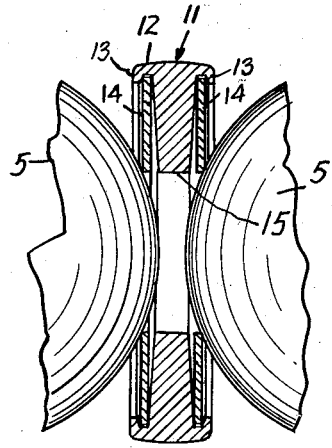
Fig. 3 is a cross-section view diametrically through one of the ball spacers, showing the normal spacing apart of successive balls.
Figure 4:
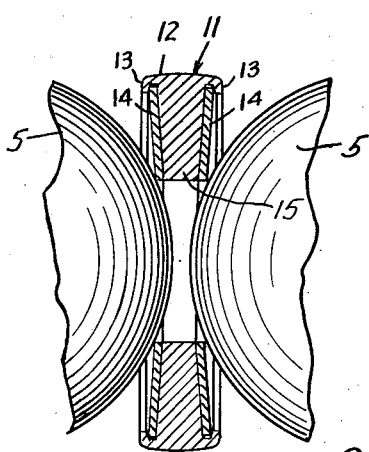
Fig. 4 is a cross-section view similar to Fig. 3 except illustrating the ball spacer in its resiliently deformed condition permitting crowding together of the adjacent balls, but preventing touching of such balls.

Interposed between successive balls 5 are spacer assemblies 11, each of which, as best shown in Figs. 3 and 4, comprises a carrier ring 12 of bronze, for example, formed with opposite peripheral rims 13, 13 which are curled in to loosely embrace the peripheral portions of thin, resiliently deformable washers 14, 14 made of heat treated steel or spring steel, for example. The carrier 12 is of maximum thickness at its periphery and tapers to less thickness at the center hole 15 so as to form spaces of triangular cross-section with the inside faces of the washers 14, 14.

Thus, as the successive balls 5 enter the loaded zones of the bearing they may crowd together by resiliently deforming said washers 14, 14 and conversely, as the successive balls 5 leave the loaded zones they are uniformly spread apart under the resilient expanding influence of said washers 14, 14.

It is to be noted that the washers 14, 14 are backed up by the solid body of intervening metal of the carrier 12 so that resilient deformation of the washers 14, 14 is arrested within the elastic limits thereof and so that the balls 5 are positively prevented from contacting each other although they may crowd together to nearly touch each other.

When the lips 13 are turned in, the washers 14, 14 should not be tightly gripped thereby, but instead, some play should be left for unimpeded resilient action of said washers 14, 14 when resiliently deformed from flat to dished form and vice versa.

A further feature of the present invention is that the chambers in the spacer assemblies 11 may serve as lubricant reservoirs from which lubricant is displaced as the balls 5 are crowded together in the highly loaded zones of the bearing.

Other modes of applying the principle of the invention may be employed, change being made as regards the details described, provided the features stated in any of the following claims, or the equivalent of such, be employed.

I therefore particularly point out and distinctly claim as my invention:

1. A ball bearing comprising bearing members formed with complemental raceways; a series of balls engaged in such raceways; and resiliently deformable spacers disposed between successive balls; said spacers each comprising a pair of annular spring elements having radially inner ball-contacting portions, and an intervening member for positively arresting the extent of resilient deformation of said elements under the crowding influence of the respective balls, said intervening member having opposite end faces that contact the peripheral portions of the respective elements and that are out of contact with the radially inner portions of the respective elements except when the latter have been resiliently deformed to such predetermined extent.

2. The combination with a ball bearing assembly, of resiliently deformable spacers interposed between successive balls for enabling crowding together and spreading apart of the balls as they enter and leave loaded zones of the bearing, each spacer comprising a pair of annular spring elements having radially inner ball-contacting portions, and an intervening carrier extending between said elements to positively arrest the extent of resilient deformation of said elements under the crowding influence of the respective balls, said elements being essentially of flat form in their unstressed condition and being resiliently deformed to dished form, and said carrier having opposite dished end faces with which the respective elements are engaged when resiliently deformed.

3. The combination with a ball bearing assembly, of resiliently deformable spacers interposed between successive balls for enabling crowding together and spreading apart of the balls as they enter and leave loaded zones of the bearing, each spacer comprising a pair of annular spring elements having radially inner ball-contacting portions, and an intervening carrier extending between said elements to positively arrest the extent of resilient deformation of said elements under the crowding influence of the respective balls, said carrier being formed with retainer lips turned radially inward over the peripheries of the respective elements so as to form a unitary spacer, said carrier having opposite end faces that contact the peripheral portions of the respective elements and that are out of contact with the radially inner portions of the respective elements except when the latter have been resiliently deformed to such predetermined extent.

4. A ball bearing spacer comprising a pair of annular spring elements, and a member engaged between the radially outer portions only of said elements whereby the radially inner portions thereof are resiliently deformable toward each other, said member having a radically inner portion which is disposed between the radially inner portions of the respective elements and in predetermined spaced relation thereto whereby the radially inner portion of said member constitutes a positive stop to limit the extent of such deformation of said elements, said member having retainer lips extending radially inward over the peripheries of the respective elements to retain said elements and member together as a unitary assembly.

References Cited in the file of this patent

UNITED STATES PATENTS

| | | |
|---|---|---|
| 1,220,616 | Englerth | Mar. 27, 1917 |
| 2,776,851 | Heinrich | Jan. 8, 1957 |
| 2,827,345 | Zeilman | Mar. 18, 1958 |

FOREIGN PATENTS

| | | |
|---|---|---|
| 27,376 | Great Britain | of 1910 |